S. L. SMITH.
FLOWER-POT.
APPLICATION FILED AUG. 24, 1916.

1,251,125. Patented Dec. 25, 1917.

Witnesses
Arthur K. Moore
Wm H Milligan

Inventor
Sidney L. Smith
By Richard Bowen
Attorney

UNITED STATES PATENT OFFICE.

SIDNEY L. SMITH, OF PITTSBURGH, PENNSYLVANIA.

FLOWER-POT.

1,251,125.  Specification of Letters Patent.  Patented Dec. 25, 1917.

Application filed August 24, 1916. Serial No. 116,759.

*To all whom it may concern:*

Be it known that I, SIDNEY L. SMITH, a citizen of the United States, residing at Pittsburgh, in the county of Allegheny and State of Pennsylvania, have invented certain new and useful Improvements in Flower-Pots, of which the following is a specification.

This invention relates to a flower pot and the primary object of the invention is to provide a flower pot adapted to contain water and fertilizer held in a compartment separate from that which contains the roots of the plant.

A further object of the invention resides in the provision of a flower pot having double walls and provided with means for permitting the passage of the contents carried between the walls into the container which holds the soil and roots of the plant.

The above and additional objects are accomplished by such means as are illustrated in the preferred embodiment and in the accompanying drawings, wherein like characters denote like or corresponding parts throughout the several views, in which.

Figure 1:
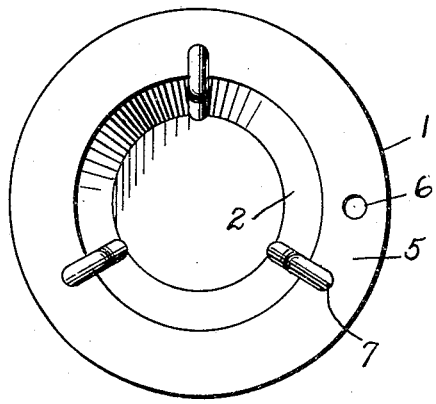
Figure 1 is a top plan view.
Figure 2:
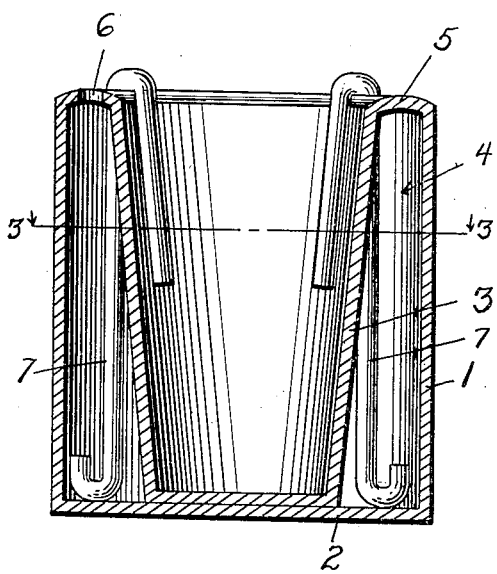
Fig. 2 is a vertical section.
Figure 3:
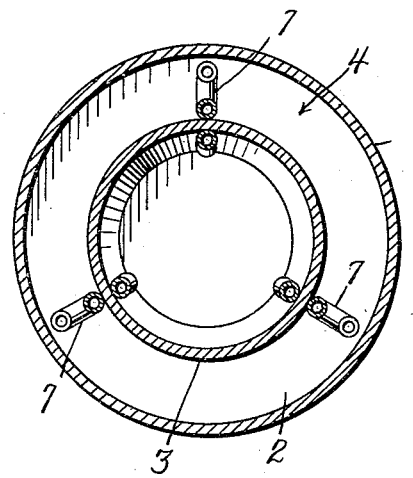
Fig. 3 is a horizontal section on the line 3—3 of Fig. 2.

Referring to the drawing, wherein is illustrated the preferred form of my invention, and in which like numerals of reference indicate corresponding parts throughout the several views, the numeral 1 indicates the outer casing of the pot which is of cylindrical formation and is provided with the bottom wall 2. Disposed within the outer casing is an inner casing 3 of frusto-conical formation similar to that of the ordinary flower pot. The walls of the inner casing are spaced considerably away from the walls of the outer casing thereby providing a compartment 4 for retaining water and fertilizer.

It is my intention to construct the device of clay or other suitable material from which pottery is constructed and to mold the device all in one piece. The upper edge of the outer casing will, therefore, be connected to the upper edge of the inner casing by an annular wall 5 thereby effectively sealing the compartment 4. An opening 6 in the wall 5 permits the pouring of water into the compartment 4 and since this compartment is completely inclosed at all times, the water therein is not readily reached by the sun and is thereby slow to evaporate. Arranged within the compartment 4 is a plurality of vertically disposed moisture conveying pipes 7 having their upper ends extended through the wall 5 where they are bent inwardly and over the edge of the inner casing and then extended downwardly to a considerable distance inside of the inner casing. The opposite ends of the pipes or tubes 7 within the compartment 4 are bent upon themselves to provide the intake tubes whereby the moisture from the water may pass from the compartment 4 into the inner casing 3.

Of course, the inner casing will be partially filled with soil and the plant roots will extend into the soil for some distance according to the size and proportion of the plant which is growing within the receptacle. The moisture from the compartment 4 will be drawn through the tubes 7 so that the plant will feed itself and at the same time an excessive amount of water in the soil will be prevented.

From the foregoing it will be observed that a very simple and durable flower pot has been provided, the details of which embody the preferred form. I desire it to be understood however, that slight changes in the minor details of construction may be made without departing from the spirit of the invention or the scope of the claims hereunto appended.

I claim:

1. A flower pot comprising an outer casing and an inner casing, the walls of the casing being spaced apart to provide an annular compartment around the inner casing, the top of the compartment being closed, the bottom of the outer casing forming a closure for the bottom of the said compartment, a plurality of vertically disposed conveying pipes mounted in the compartment and having their upper ends extended through the closed end of the compartment and bent inwardly and downwardly over the edge of the said inner casing and extended downwardly to a considerable distance inside of the casing, the opposite ends of the pipes within the compartment being bent upon themselves to provide intake tubes.

2. A flower pot comprising an outer casing and an inner casing one being disposed within the other for providing an annular compartment between the two casings, the upper edges of the casings connected by the wall extending across the top of the compartment, and a plurality of pipes vertically arranged within the compartment and extending into the inner casing.

3. A flower pot comprising an outer casing and an inner casing one being disposed within the other for providing an annular compartment between the two casings, the upper edges of the casings connected by a wall extending across the top of the compartment, a plurality of pipes vertically arranged within the compartment and extending into the inner casing, the lower ends of the pipes being disposed in the bottom of the compartment and bent upon themselves to provide inlets for the contents within the compartment and the opposite ends of the tubes being projected downwardly within the inner casing.

In testimony whereof I affix my signature in presence of two witnesses.

SIDNEY L. SMITH.

Witnesses:
R. F. McDERMOTT,
DAVID JAMES.

Copies of this patent may be obtained for five cents each, by addressing the "Commissioner of Patents. Washington, D. C."